(No Model.)

H. BROWN.
PIPE THREADING DIE STOCK.

No. 390,444. Patented Oct. 2, 1888.

Witnesses.
J. M. Jackson
Chas. H. Riches

Inventor.
Horace Brown
by
Donald C. Ridout & Co
Atty

UNITED STATES PATENT OFFICE.

HORACE BROWN, OF TORONTO, ONTARIO, CANADA, ASSIGNOR OF ONE-HALF TO JOHN LAXTON, OF SAME PLACE.

PIPE-THREADING DIE-STOCK.

SPECIFICATION forming part of Letters Patent No. 390,444, dated October 2, 1888.

Application filed May 3, 1888. Serial No. 272,646. (No model.)

*To all whom it may concern:*

Be it known that I, HORACE BROWN, of the city of Toronto, in the county of York, in the Province of Ontario, Canada, mechanic, have invented a certain new and Improved Screw-Cutter, of which the following is a specification.

The object of the invention is to design a tool by which the end of a pipe or rod situated in a position of limited space may have a thread cut upon it; and it consists, essentially, in fitting a screw-die into a head provided with a sleeve to fit over the end of the pipe or rod to be cut, the handle being journaled on the head and provided with two ratchet-pawls, either of which may be made to engage with ratchet-teeth formed on the head, the sleeve of which has a thread cut on it to enter a collar fitted onto the pipe or rod to be cut, substantially as hereinafter more particularly explained.

Figure 1:
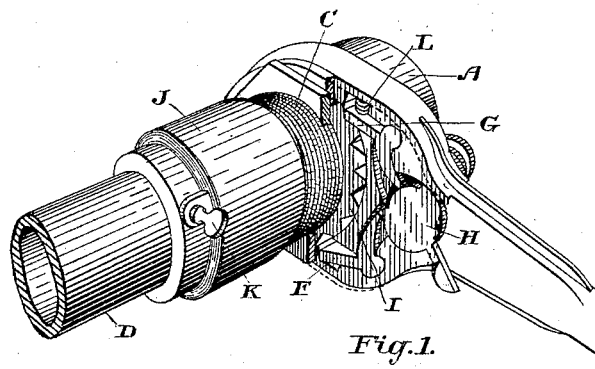
Figure 2:
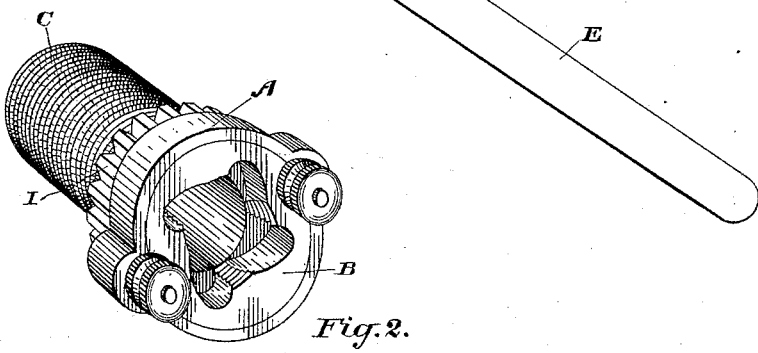
Figure 3:
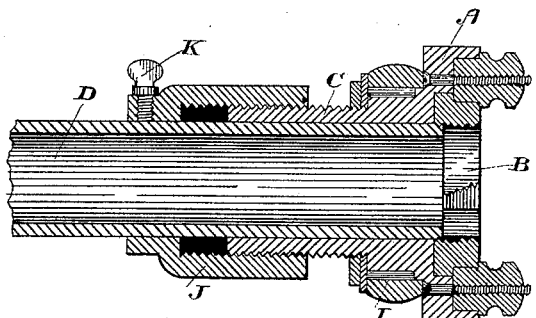

Figure 1 is a perspective view, partially in section, of my improved screw-cutting tool. Fig. 2 is a detail of the die-head. Fig. 3 is a sectional elevation of Fig. 2.

In the drawings, A represents a head arranged to contain the screw-cutting die B.

C is a sleeve extending from the head A and designed to fit the pipe D, on the end of which it is desired to cut a thread.

E is a handle, one end of which is designed to fit and be journaled on the head A. In the head of this handle are pivoted two pawls, F and G.

H is a pivoted roller notched to engage with the tails of the pawls F and G in such a manner that when the roller is moved on its pivot it will throw one pawl, F, into connection with the teeth I formed on the head A, and simultaneously throw the other pawl, G, out of connection with the said teeth, and vice versa. It will thus be seen that by a very simple movement of the handle E the head A may be caused to revolve in either one direction or the other, according to the particular pawl which may at the time be in contact with the teeth I.

It will be noticed that the sleeve C is screwed, and is designed to screw into the collar J, which fits onto the pipe D, and may be held in any desired position by the set-screw K. The thread on the sleeve C and in the collar J correspond with the thread in the die B. Consequently when the die B is placed against the end of the pipe D, the sleeve C being previously screwed a little into the collar J, which has been fixed to the pipe by the set-screw K, the revolving of the head A will cause the sleeve C to screw into the collar J and draw the die B into the end of the pipe D, thereby causing the die to enter properly onto the end and cut the desired thread.

By pushing the roller H over in the opposite direction the pawl F is lifted out of connection with the teeth I, and the pawl G permitted to be forced into connection with the said teeth by the action of the spring L.

What I claim as my invention is—

1. A head, A, having fixed to it the die B, and provided with a sleeve, C, to fit over the pipe or rod to be cut, in combination with the collar J, a handle, E, journaled in the head A, and provided with pawls F and G to engage with teeth I in the said head A, and the notched roller H, engaging the tails of said pawls, substantially as and for the purpose specified.

2. A collar, J, and a head, A, having fixed to it the die B, and provided with a sleeve, C, to fit over the pipe or rod to be cut, a thread being cut on the said sleeve to correspond with a thread cut in the collar J, which is fixed to the pipe or rod to be cut, in combination with a handle, E, journaled in the head A, and provided with pawls F and G to engage with teeth I in the said head A, and the notched roller H, engaging the tails of said pawls, substantially as and for the purpose specified.

Toronto, April 11, 1888.

HORACE BROWN.

In presence of—
  CHARLES C. BALDWIN,
  CHAS. H. RICHES.